(12) United States Patent
Zhao et al.

(10) Patent No.: US 6,539,343 B2
(45) Date of Patent: *Mar. 25, 2003

(54) METHODS FOR CONDITION MONITORING AND SYSTEM-LEVEL DIAGNOSIS OF ELECTRO-MECHANICAL SYSTEMS WITH MULTIPLE ACTUATING COMPONENTS OPERATING IN MULTIPLE REGIMES

(75) Inventors: Feng Zhao, Campbell, CA (US); Eric-J. Manders, Nashville, TN (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,113

(22) Filed: Feb. 3, 2000

(65) Prior Publication Data

US 2002/0103626 A1 Aug. 1, 2002

(51) Int. Cl.[7] .............................................. G06F 19/00
(52) U.S. Cl. ....................................... 702/190; 708/400
(58) Field of Search ................................ 702/189, 190; 708/400; 706/911; 700/30, 47, 51; 703/6, 13, 22

(56) References Cited

U.S. PATENT DOCUMENTS

| | | | | |
|---|---|---|---|---|
| 5,646,600 A | * | 7/1997 | Abdel-Malek et al. | 340/679 |
| 5,995,910 A | * | 11/1999 | Discenzo | 702/56 |
| 6,014,598 A | * | 1/2000 | Duyar et al. | 701/29 |
| 6,105,015 A | * | 8/2000 | Nguyen et al. | 706/26 |
| 6,105,149 A | * | 8/2000 | Bonissone et al. | 714/26 |
| 6,178,386 B1 | * | 1/2001 | Shertukde et al. | 702/56 |
| 6,181,975 B1 | * | 1/2001 | Gross et al. | 700/29 |
| 6,208,951 B1 | * | 3/2001 | Kumar et al. | 702/191 |
| 6,208,953 B1 | * | 3/2001 | Milek et al. | 703/7 |
| 6,260,427 B1 | * | 7/2001 | Jones et al. | 73/865.9 |
| 6,272,479 B1 | * | 8/2001 | Farry et al. | 706/13 |
| 6,278,962 B1 | * | 8/2001 | Klimasauskas et al. | 703/13 |
| 6,295,510 B1 | * | 9/2001 | Discenzo | 702/183 |
| 6,356,857 B1 | * | 3/2002 | Qin et al. | 702/185 |
| 6,393,373 B1 | * | 5/2002 | Duyar et al. | 318/490 |

OTHER PUBLICATIONS

Zhang et al., Wavelet Transform Based Sensor Validation, IEEE, 1999.*
Yen et al., "Conditional Health Monitoring Using Vibration Signatures", IEEE, 1999.*
Gaouda et al., "Wavelet–Based Intelligent System for Monitoring Non–Stationary Disturbances", IEEE, 2000.*

(List continued on next page.)

*Primary Examiner*—Patrick Assouad
(74) *Attorney, Agent, or Firm*—Finnegan, Henderson, Farabow, Garrett & Dunner, L.L.P.

(57) ABSTRACT

The present invention discloses methods for condition-based monitoring of a system and its components using joint time-frequency analysis and signal demodulation. A first method allows construction of models of non-stationary signals having multiple time and frequency scales of interest. In particular, the method uses wavelet analysis to encode essential information in time-frequency transformations and provides a signal model for an operating fault or normal operation of a system of interest. A second method uses the signal models for condition-based monitoring to detect a change in a signal. In this method, the signal models are correlated with sensor signals to determine the operating condition of a system or system component. A third method for condition-based monitoring uses signal demodulation. In this method, a nominal response of a system component is subtracted from a detected signal to more reliably detect subtle changes in the signal due to component degradation.

28 Claims, 5 Drawing Sheets

OTHER PUBLICATIONS

Kang et al., "Analysis of Vibration Signals for Condition Monitoring of Power Switching Equipment Using Wavelet Transform", IEEE, 1998.*

Ye et al., "The Abundance of Residuals and Fuzzy Decision–Making for Fault Diagnosis and Sensor Signal Validation", IEEE, 1996.*

Mufti et al, "Automated Fault Detection and Identification Using a Fuzzy–Wavelet Analysis Technique", IEEE, 1995.*

Patton et al., "Artificial Intelligence Approaches to Fault Diagnosis", IEEE, 1999.*

Gertler, "Survey of Model–Based Failure Detection and Isolation In Complex Plants", IEEE, 1988.*

Betta et al., "Instrument Fault Detection and Isolation: State of the Art and New Research Trends", IEEE, 1998.*

Chen et al., "Wavelet Neural Network Based Transient Fault Signal Detection and Identification", IEEE, 1997.*

* cited by examiner

METHODS FOR CONDITION MONITORING AND SYSTEM-LEVEL DIAGNOSIS OF ELECTRO-MECHANICAL SYSTEMS WITH MULTIPLE ACTUATING COMPONENTS OPERATING IN MULTIPLE REGIMES

FIELD OF THE INVENTION

The present invention relates generally to the field of condition monitoring and diagnosis, and more particularly to methods for system-level condition monitoring and diagnosis using time-frequency analysis mechanisms.

BACKGROUND OF THE INVENTION

Future electro-mechanical machines and structures will increasingly participate in their own service and maintenance using embedded distributed self-diagnostics that are remotely accessible to monitor machine health, detect and isolate subtle performance degradation, and in some cases even reconfigure some machines to adapt to changing operating environments. Traditionally, corrective maintenance and preventative maintenance have been the only two service paradigms. More recently, predictive or condition-based maintenance, enabled by Micro-Electro-Mechanical Systems (MEMS) is emerging as an alternative. Batch-fabricated MEMS sensors are far less expensive than conventional sensors and, thus, encourage larger-scale deployment throughout factories and in vehicles and devices. Condition-based maintenance is just-in-time maintenance based on the actual health of the machine and its components. Since it avoids the cumulative cost of unnecessary service calls associated with preventative maintenance and the occurrence of machine failure and degradation associated with corrective maintenance, condition-based maintenance provides substantial cost savings.

Real-time signal analysis is critical for condition-based monitoring of structures and electro-mechanical systems. An electro-mechanical system or a complex structure comprising multiple moving elements in complex operating regimes can exhibit extremely complex system level responses due to the interaction between the actuating elements and supporting mechanical structures. Fault manifestation in these systems is typically non-stationary in that there is no persistent means or variance over time. The actuating elements such as motors and solenoids produce rich mechanical excitation signals at multiple time and frequency scales. Traditional Fourier spectral analysis, while useful for establishing the signal bandwidth, is unsuitable for analyzing the time-varying properties of the signal that are important for the purpose of fault diagnosis. One problem is that failure modes of system components are difficult to identify and characterize using time-based or frequency-based analysis alone. Another problem is that signals can vary in quality due to external and internal noise as well as multiple signal interference. Furthermore, subtle changes in signals indicative of machine conditions such as motor bearing wear are often buried in larger responses due to, for example, structural resonances. Traditionally, signal demodulation to get rid of irrelevant components, such as performed in the telecommunications industry, is carried out in frequency domains. Because the signals from machine health monitoring applications are typically transitory and time varying, many real-time monitoring applications require more efficient demodulation methods to improve the signal to noise ratio in fault detection.

In light of the foregoing, there is a need for a method for condition-based monitoring of a system and its components using joint time-frequency analysis.

SUMMARY OF THE INVENTION

Accordingly, the present invention is directed to a method for condition-based monitoring of a system and its components using joint time-frequency analysis that substantially obviates one or more of the problems due to limitations and disadvantages of the related art.

In accordance with the purposes of the present invention, as embodied and broadly described, the invention provides a method for constructing time-frequency models of non-stationary signals. The first step is to collect a plurality of training data from at least one sensor in a system of interest, wherein the training data includes an operation fault of the system. The next step is to extract wavelet coefficient features from the training data by performing wavelet analysis. Signal templates of the operating fault are then constructed using the wavelet coefficients.

In another embodiment, the invention provides a method for condition-based monitoring of a system of interest. The first step is to provide signal templates representing a normal operating condition and a faulty operating condition of a system of interest, wherein the signal templates comprise wavelet coefficients. Next, sensor signal segments are constructed by extracting wavelet coefficient features using wavelet analysis from a signal from a sensor monitoring the system of interest. The signal template are then convolved with the segments of the signal from the sensor monitoring the system of interest. Finally, the segments of the sensor signal are classified into the normal and faulty operating conditions of the system based on convolution amplitude.

In still another embodiment, the present invention provides a method for condition-based monitoring of a component of a system using a residual signal. In the first step, a signal model of the nominal response of the component is constructed. Next, a signal from a sensor monitoring the component is detected. And, the signal model is subtracted from the signal from the sensor monitoring the system to create a residual signal.

In another embodiment, the present invention provides a method for condition-based monitoring of a system having a plurality of components. A signal model of the nominal response for each of plurality of components in the system is constructed. Then, signals from a plurality of sensors monitoring the plurality of components are detected. The signal models are subtracted from each signal from the plurality of sensors monitoring the components to create a residual signal for the sensor.

In another embodiment, the present invention provides another method for condition-based monitoring of a system having a plurality of components. In this embodiment, a signal model of the nominal response at each of a plurality of sensors monitoring a plurality of components is constructed. Next, signals from a plurality of sensors monitoring the plurality of components are detected. Then, the signal models are subtracted from the signal from the corresponding sensor monitoring the components.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

DETAILED DESCRIPTION OF THE PREFERRED EMBODIMENTS

Reference will now be made in detail to the preferred embodiments of the invention, examples of which are illustrated in the accompanying drawings.

Figure 1:
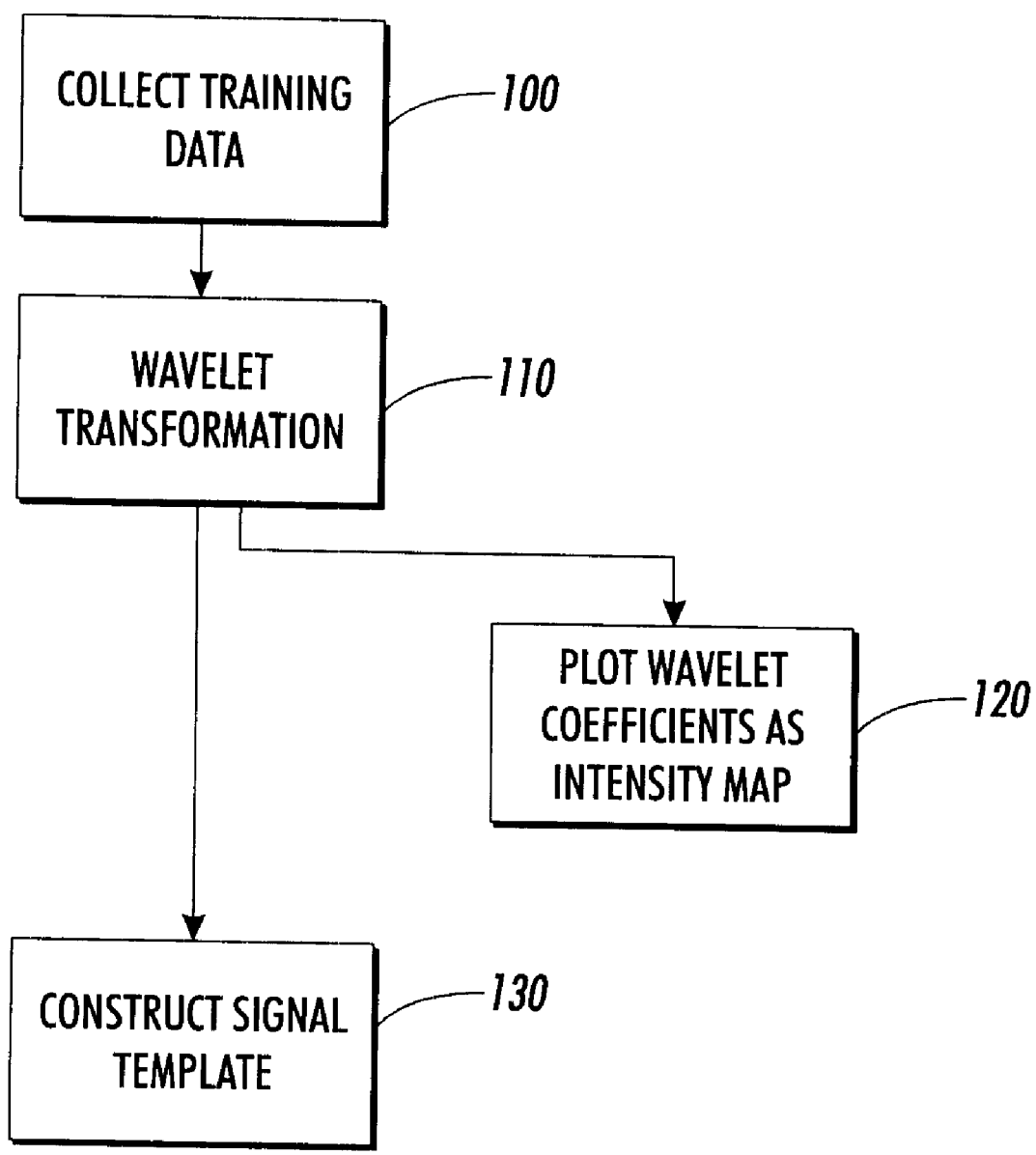
FIG. 1 is a block diagram illustrating a method consistent with the present invention for constructing models of non-stationary signals having multiple time and frequency scales of interest.

FIG. 1 is a block diagram illustrating the steps for constructing models of non-stationary signals having multiple time and frequency scales of interest. In particular, the method provides a signal model for an operating fault or normal operation of a system of interest. In step 100, a plurality of training data is collected from a sensor monitoring the system of interest. The system of interest is an electro-mechanical machine or structure with multiple moving components in a complex operating regime. The sensor is one or more devices that respond to vibration, thermal, acoustic, electrical, electromagnetic, optical, chemical, or other stimuli. The sensor is preferably an array of devices that respond to stimuli. The sensor can be a conventional sensor, but is preferably a fabricated MEMS device. The training data includes signals representing normal operating conditions and a known operating fault of the system.

In step 110, the training data including signals representing normal operation and an operating fault is analyzed using wavelet transformation. Wavelet transformation of a signal produces a time and scale (corresponding to frequency) dependent expansion of the signal. Since wavelet analysis typically requires specification of a fixed window of time, the training data is segmented into a series of segments having the specified time window prior to the wavelet analysis. In a preferred embodiment, the training data is repeatedly collected over a moving window of time. Training data collected in this manner results in a series of data segments having a time duration equal to the fixed window of time. The window should be larger than the period of the slowest component in the signals representing normal operating conditions and known operating faults of the system. Preferably, the coefficients of wavelet transformation for an operating condidtion are created by first computing a wavelet transformation for each of the training data segments corresponding to the condition, and then averaging coefficients over the tranformations.

If desired, the wavelet coefficients can be plotted as a two dimensional intensity map where the horizontal axis is time and the vertical axis is scale as shown in step 120.

In step 130, signal templates are constructed from the training data to record the onset of an event in signal (onset of the major wavelet component representing the normal condition or operating fault), the duration of the signal representing the operating fault as measured by the temporal extent of the significant wavelet components, and the magnitude of the wavelet components as described by the sequences of wavelet coefficients. Signal templates of normal operation are also constructed from the training data.

In another embodiment, the method includes the step of collecting training data for a plurality of known operating faults and constructing a signal template for each operating fault. The method preferably includes a plurality of sensors responsive to a plurality of stimuli. Sensors can include, for example, devices responsive to thermal, electrical, acoustic, electrical, electromagnetic, optical, chemical, or other stimuli. In this manner, a library of templates of operating faults of the system of interest can be collected.

FIGS. 2 and 3 show the construction of a signal template for normal and faulty operation of a paper path drive plate in a Xerox copying system. The paper drive plate uses electro-mechanical actuators to move paper from a paper tray to the next step in paper handling. The paper drive plate includes five actuators: a main paper drive motor; two paper tray elevator motors; and two acquisition roll solenoids. The solenoid either releases the acquisition roll to engage the paper or lifts the roll off the paper. The elevation motor keeps the top of a paper stack level to the paper path entrance. Thus, a complete cycle of paper acquisition and feeding consists of a sequence of motor/solenoid activations.

An accelerometer is used to acquire training data of normal and faulty vibration signals of one of the solenoids. The normal operating condition includes vibration from the solenoid switching on and off. Faulty operation of the solenoid includes, for example, increased friction of the rod due to wear and tear of the components or contamination of the moving parts with toner particles. The rod is a moving part of the solenoid that travels between two stops under the force of an electromagnetic field or restoring springs. A faulty operating condition is simulated by intentionally compromising the travel of the rod resulting in a softening of the impact on the stop as the solenoid is activated.

Figure 2A:
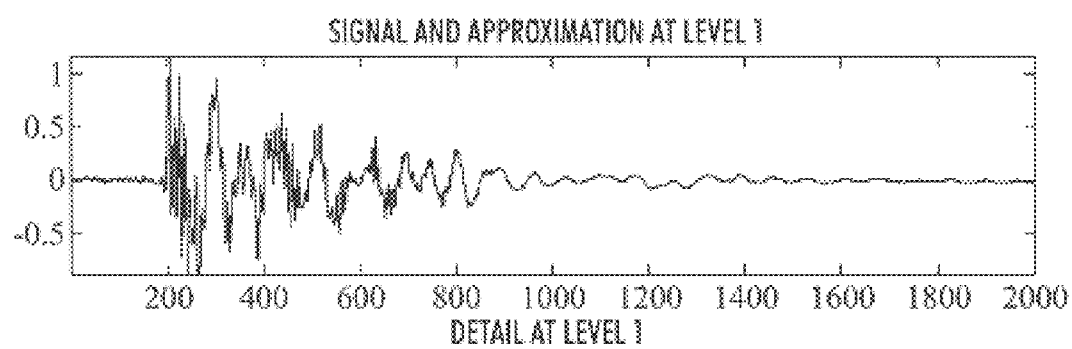
FIGS. 2a–b show the construction of a signal template consistent with the present invention for a vibration signal detected by a sensor representing normal operation of the solenoid.
Figure 2B:
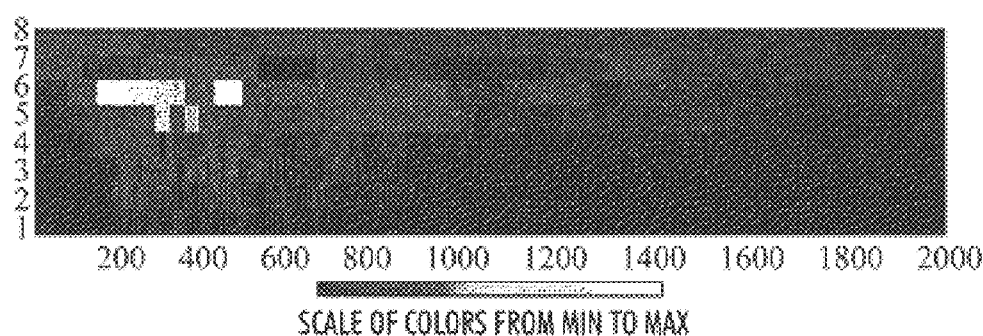

FIG. 2a shows the vibration signal detected by the sensor representing normal operation of the solenoid. Using conventional wavelet analysis techniques such as discrete wavelet transformation, wavelet coefficients for the sensor signal are obtained. FIG. 2b is a plot of the wavelet coefficients as a two-dimensional intensity map where the x-axis is time and the y-axis is scale.

Figure 3A:
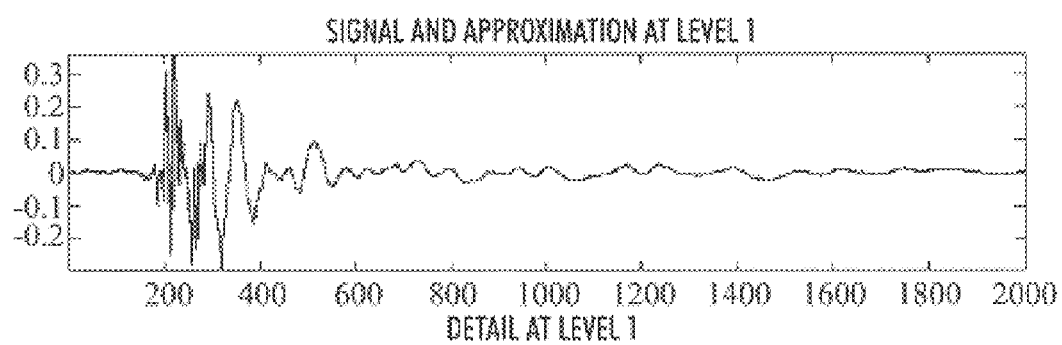
FIGS. 3a–b show the construction of a signal template consistent with the present invention for a vibration signal detected by a sensor representing faulty operation of the solenoid.
Figure 3B:
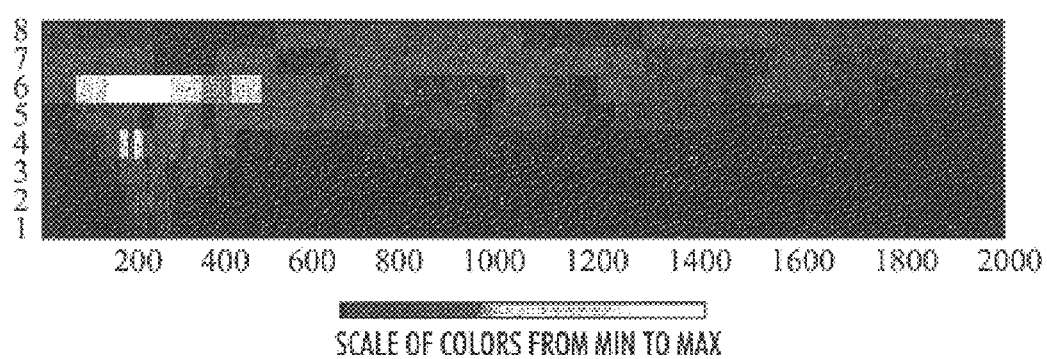

FIG. 3a shows the vibration signal detected by the sensor representing faulty operation of the solenoid. FIG. 3b is a plot of the Wavelet coefficients as a two-dimensional intensity map. As shown by FIGS. 2b and 3b, the wavelet coefficients are distinctly different for the normal and faulty operating conditions.

Figure 4:
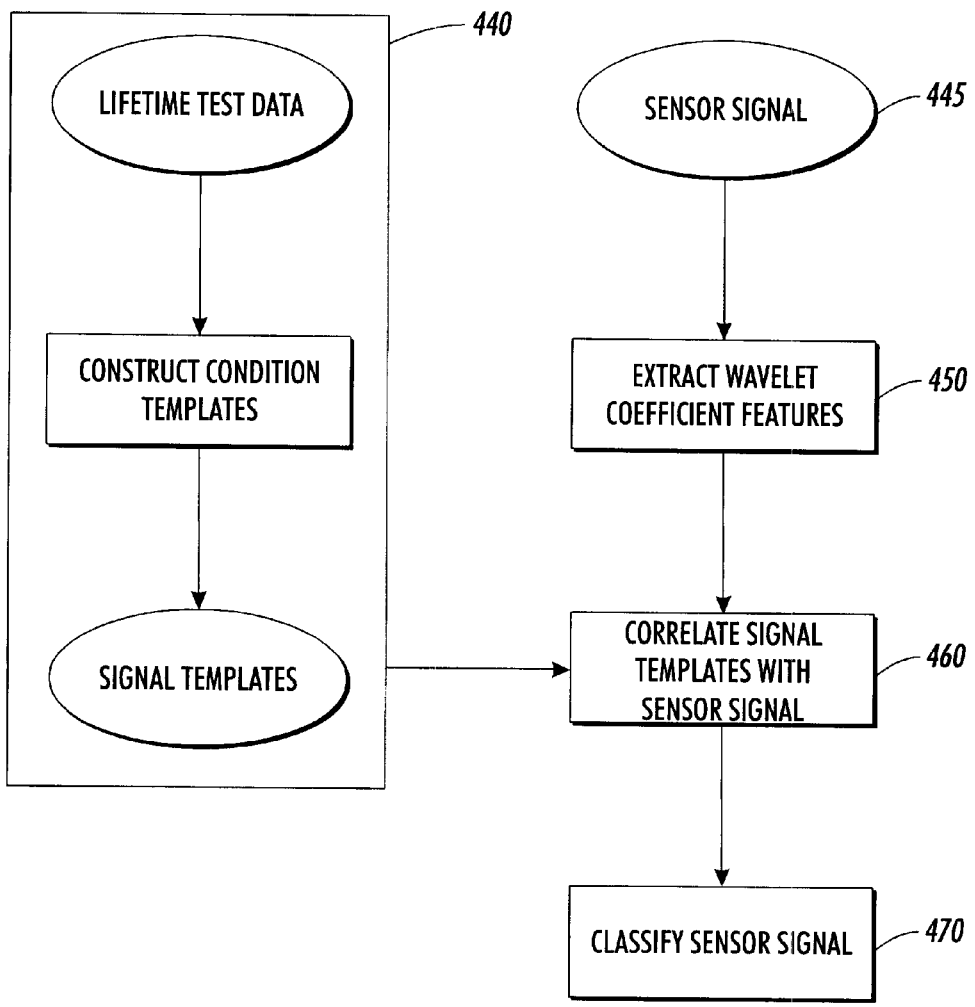
FIG. 4 is a block diagram illustrating the steps of a method consistent with the present invention for condition-based monitoring using joint time-frequency analysis to detect a change in a signal.

FIG. 4 is a block diagram illustrating the steps of a method for condition-based monitoring using joint time-frequency analysis to detect a change in a signal consistent with another embodiment of the present invention. In step 440, a plurality of signal templates are provided representing a normal operating condition and a faulty operating condition of a system of interest where the signal templates comprise wavelet coefficients. The system of interest is an electro-mechanical system or structure. Signal templates are constructed using lifetime test data.

Then, as shown in step 445, a signal provided by a sensor monitoring the system of interest is detected. In step 450, wavelet coefficient features are extracted from this signal using wavelet analysis. In a preferred embodiment, the signal from the sensor is a series of segments collected over a moving window of fixed time duration. Then, in step 460, signal templates constructed in step 440 are correlated with segments of the sensor signal. A segment of the sensor signal matching faulty signal templates produces an amplitude peak in the result, and is detected and classified, in step 470, as a fault indication. Segments of the sensor signal matching normal signal templates are classified as normal operation of the system. Classification of the sensor signal segments is based on correlation amplitude.

In another embodiment, the method includes the step of extracting wavelet coefficient features from a plurality of signals from a plurality of sensors monitoring the system of interest. The sensors are preferably MEMS sensors. Signal templates of normal and faulty operation are then constructed. The signal templates can then be correlated against a plurality of signals from the plurality of sensors to determine the condition of the system of interest.

In another embodiment of the present invention, decisional precedures are used to classify the sensor signal segments. Decisional procedures such as a discriminant analysis method, for example, use a discriminant function to measure how close the sensor signal segments are to each signal template, preferably in the wavelet coefficient space. Then, depending on the similarity of the sensor signal to a normal operating condition template or a faulty operating condition template, the sensor signal is classified as a fault indication or a normal operating signal.

Figure 5:
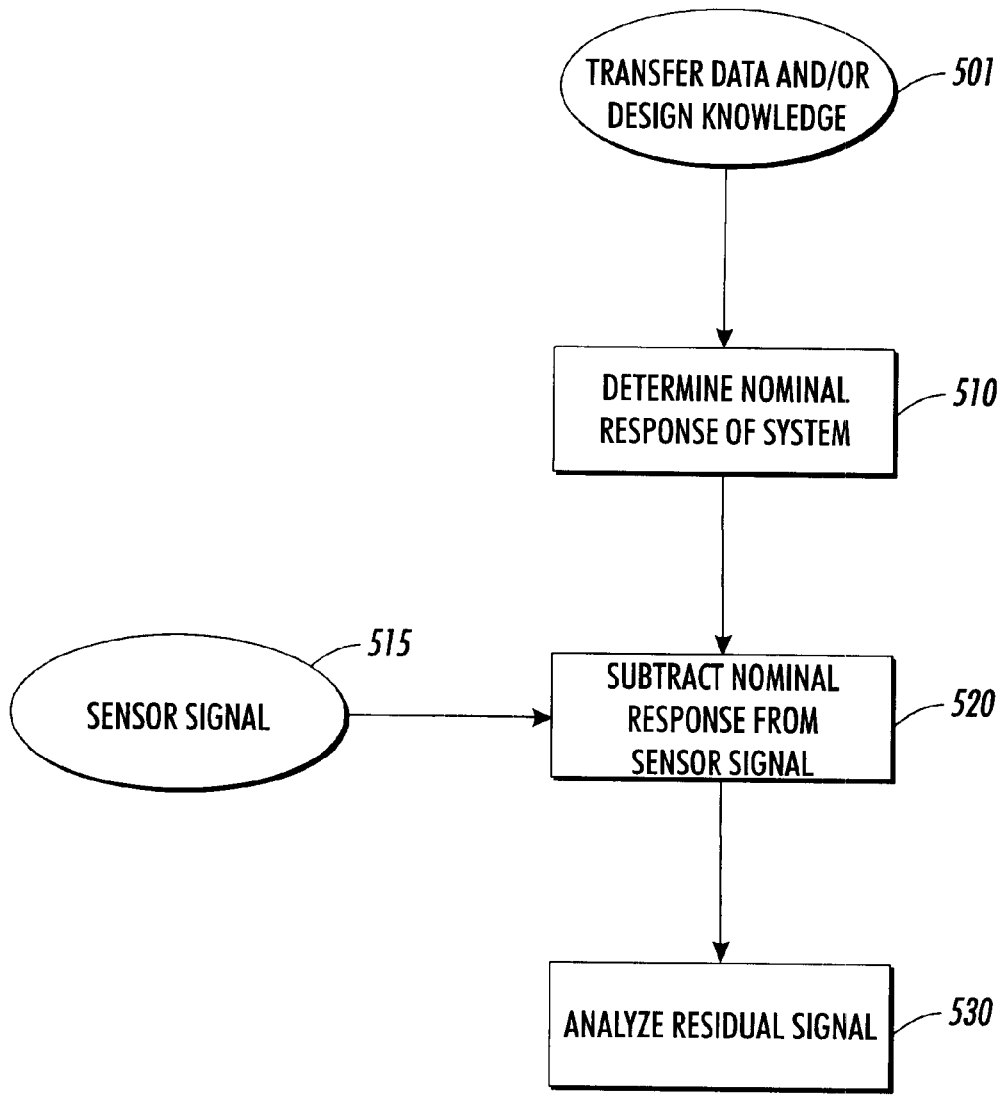
FIG. 5 is a block diagram illustrating the steps of a method consistent with the present invention for condition-based monitoring using signal demodulation.

FIG. 5 is a block diagram illustrating the steps of a method for condition-based monitoring by signal demodulation. In this method, a nominal response of a system component, such as responses due to structural resonances, is subtracted from a detected signal to be able to more reliably detect subtle changes in the signal due to component degradation, such as motor bearing defects.

A signal model for the nominal response of a system component of interest is constructed in step 510 from training data 501. In one embodiment, the signal model is constructed from a statistical average of training data segments corresponding to the normal operating condition of the component. In another embodiment, the signal model is the signal template of wavelet coefficients for the normal condition. In yet another embodiment, the signal model is an auto-regression model determined from the training data. In still another embodiment, the signal model is determined by a lumped parameter model of the component behavior whose parameters are estimated by statistical regression methods. In this embodiment, an example of a lumped parameter model is the $1^{st}$ mode vibration model for the rectangular metal backplane in the main paper drive of a Xerox copying system. The structure of the vibration model is determined using design knowledge such as the dimension of the plate and material property. The model parameters such as stiffness and damping are determined by, for example, regression methods using training data.

In step 520, the signal model for the nominal response of the system component is subtracted from a signal from a sensor monitoring the component to create a residual signal.

The residual signal is preferably analyzed, as shown in step 530, to detect subtle changes in the original signal. In another embodiment, the residual signal is analyzed by comparing it to the templates representing normal and faulty operating conditions of the actuator.

In another embodiment, the method includes determining the nominal response of a component excited by a plurality of actuators in the system, using a model of component response, and subtracting the cumulative nominal responses of all the components from sensors monitoring the corresponding actuators.

In another embodiment, the method includes determining the nominal responses of a plurality of components excited by a plurality of actuators in the system, using models for each component, and subtracting the nominal responses from sensors monitoring the corresponding actuators.

In yet another embodiment, the method includes determining the nominal responses at a plurality of sensors monitoring corresponding components using models for each sensor response. The nominal responses are then subtracted from signals of sensors monitoring the corresponding actuators.

It will be apparent to those. skilled in the art that various modifications and variations can be made in the disclosed methods for constructing signal modules and their use in condition-based monitoring of a system. Thus, it is intended that the present invention cover the modifications and variations of this invention provided they come within the scope of the appended claims and their equivalents.

What is claimed is:

1. A method for constructing time-frequency models of non-stationary signals comprising the steps:

collecting a plurality of training data from at least one sensor embedded in a system of interest, wherein the training data includes an operating fault of the system;

extracting wavelet coefficient features from the training data by performing wavelet analysis;

constructing a signal template of the operating fault using the wavelet coefficients.

2. The method of claim 1, wherein the signal template comprises a sequence of wavelet coefficients that represent an onset of the operating fault signal, a duration of the operating fault signal, and a magnitude of wavelet components described by the sequences of wavelet coefficients.

3. The method of claim 1, wherein the training data includes a plurality of known operating faults.

4. The method of claim 1 wherein the training data includes nominal operation of the system.

5. The method of claim 1, wherein the plurality of training data is repeatedly collected over a fixed window of time.

6. The method of claim 1, further including the step of collecting training data from a plurality of sensors responsive to a plurality of stimuli.

7. The method of claim 1, further including the step of computing wavelet coefficient features from multiple training data segments corresponding to an operating condition and statistically averaging the features to form a signal template for the operating condition.

8. The method of claim 1, further including the step of constructing a signal template for the normal operation of the system from the training data.

9. The method of claim 1, further including the step of constructing a plurality of signal templates for the plurality of known operating faults from the training data.

10. The method of claim 6, further including the step of building a library of signal templates of operating faults of the system of interest from the plurality of sensor signals.

11. A method for condition-based monitoring of a system of interest comprising the steps:

providing signal templates representing a normal operating condition and a faulty operating condition of a system of interest, wherein the signal templates comprise wavelet coefficients;

constructing sensor signal segments by extracting wavelet coefficient features using wavelet analysis from a signal from a sensor monitoring the system of interest, wherein the sensor is embedded in the system of interest;

convolving the signal template with the segments of the signal from the sensor monitoring the system of interest; and classifying the segments of the sensor signal into the normal and faulty operating conditions of the system based on correlation amplitude.

12. The method of claim 11, wherein the signal from the sensor is collected from a moving window of fixed time duration.

13. The method of claim 11, wherein wavelet coefficient features are extracted using wavelet analysis from a plurality of signals from a plurality of sensors monitoring the system of interest.

14. The method of claim 13, wherein the signal templates are correlated with a plurality of signals from a plurality of sensors.

15. The method of claim 14, wherein the signal templates represent normal and faulty operating conditions for a plurality of components of the system of interest.

16. The method of claim 11, wherein a discriminant analysis method is used to classify the sensor signals.

17. The method of claim 11, wherein the signal templates comprise wavelet coefficients constructed from training data.

18. The method of claim 11, wherein the step of classification of sensor signals uses decision procedures.

19. A method for condition-based monitoring of a component of a system comprising the steps:

constructing a signal model of the nominal response of the component from training data;

detecting a signal from a sensor monitoring the component; and subtracting the signal model from the signal from the sensor monitoring the system to create a residual signal.

20. The method of claim 19, wherein the signal model for the nominal response is determined by statistically averaging multiple trained data segments corresponding to the normal operating condition.

21. The method of claim 20, wherein the signal model for the nominal responses is a signal template of normal operation of the system constructed from training data.

22. The method of claim 19, wherein the signal model for the nominal response is determined by a statistical regression on training data corresponding to the normal operating condition.

23. The method of claim 19, wherein the signal model for the nominal response is determined by a lumped parameter model of the component under normal operating condition, wherein the model parameters are estimated by a statistical regression.

24. The method of claim 19, further including the step of analyzing the residual signal to detect changes in the sensor signal.

25. The method of claim 24, wherein the residual signal is analyzed by classifying the sensor signal using signal templates of normal and faulty operating conditions.

26. A method for condition-based monitoring of a system having a plurality of components, comprising the steps of:

constructing a signal model of the nominal response for each of plurality of components in the system;

detecting signals from a plurality of sensors monitoring the plurality of components; and subtracting the signal models from each signal from the plurality of sensors monitoring the components to create a residual signal for the sensor.

27. The method of claim 26, wherein the nominal responses of the components result from excitation from a plurality of actuators.

28. A method for condition-based monitoring of a system having a plurality of components, comprising the steps of:

constructing a signal model of the nominal response at each of a plurality of sensors monitoring a plurality of components;

detecting signals from a plurality of sensors monitoring the plurality of components; and subtracting the signal models from the signal from the corresponding sensor monitoring the components.

* * * * *